(12) United States Patent
Chester et al.

(10) Patent No.: US 11,623,866 B1
(45) Date of Patent: Apr. 11, 2023

(54) METAL-ENCAPSULATED CARBON NANOTUBES AND METHOD FOR PRODUCDING SUCH CARBON NANOTUBES VIA SOLVENT SHELL REACTIONS WITH METALLIC IONS

(71) Applicant: Mainstream Engineering Corporation, Rockledge, FL (US)

(72) Inventors: Gregory E. Chester, Orlando, FL (US); Anna P. Skinner, Rockledge, FL (US); Justin J. Hill, Merritt Island, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 39 days.

(21) Appl. No.: 17/371,498

(22) Filed: Jul. 9, 2021

Related U.S. Application Data

(62) Division of application No. 16/161,640, filed on Oct. 16, 2018, now abandoned.

(51) Int. Cl.
| | |
|---|---|
| *B82Y 40/00* | (2011.01) |
| *C01B 32/174* | (2017.01) |
| *B32B 1/00* | (2006.01) |
| *B82Y 30/00* | (2011.01) |

(52) U.S. Cl.
CPC .............. *C01B 32/174* (2017.08); *B32B 1/00* (2013.01); *B82Y 30/00* (2013.01); *B82Y 40/00* (2013.01); *C01B 2202/02* (2013.01); *C01B 2202/22* (2013.01); *C01B 2202/24* (2013.01); *C01P 2002/50* (2013.01); *C01P 2002/82* (2013.01); *C01P 2004/04* (2013.01)

(58) Field of Classification Search
CPC ..................................................... B82Y 40/00
See application file for complete search history.

(56) References Cited

U.S. PATENT DOCUMENTS

2015/0298115 A1* 10/2015 Campidelli ........ A61K 49/1884
252/182.1
2016/0214087 A1* 7/2016 Saleh ..................... C07C 45/28

OTHER PUBLICATIONS

Kang and Taton, Micelle-Encapsulated Carbon Nanotubes: A Route to Nanotube Composites, J. Am. Chem. Soc. 2003, 125, 19, 5650-5651 (Year: 2003).*
Park et al., Controlled assembly of carbon nanotubes encapsulated with amphiphilic block copolymer, Carbon 45 (2007) 2072-2078 (Year: 2007).*

(Continued)

*Primary Examiner* — Hoa (Holly) Le
(74) *Attorney, Agent, or Firm* — Michael W. O'Neill, Esq.

(57) ABSTRACT

A method encapsulates nanoscale material by producing a suspension of the nanostructure material in a first solvent using a micelle surrounding the nanostructure material. The micelle surrounding the suspended nanostructure material is swollen by adding to and mixing with the suspension an immiscible phase second solvent containing a precursor. The precursor is then reduced by adding a reducing reactant selectively soluble in the first solvent that reacts to the precursor containing reactant selectively solvated in the second solvent to encapsulate the nanostructure material. A metal-nanostructure composite can be provided by collecting and mixing the metal-shell encapsulated nanostructure product produced by the aforementioned method into a metal matrix.

11 Claims, 9 Drawing Sheets

(56) References Cited

OTHER PUBLICATIONS

Fraunhofer Institute of Manufacturing Technology and Advanced Materials IFAM, Branch Lab Dresden, Metal / Carbon Composites brochure, Sep. 30, 2010.

Peng et al., Measurements of near-ultimate strength for multiwalled carbon nanotubes and irradiation-induced crosslinking improvements, nature nanotechnology, vol. 3, Oct. 2008, pp. 626-631, Macmillian Publishers Limited.

* cited by examiner

| Hydrazine to Cu(acac)$_2$ Molar Ratio | 10:1 | Stable, but no benefit | Unstable | Unstable |
|---|---|---|---|---|
| | 7:1 | Stable | Stable | Unstable |
| | 2:1 | Stable | Stable | Unstable |
| | | 0.01 M | 0.05 M | 0.10 M |
| | | Cu(acac)$_2$ Concentration | | |

METAL-ENCAPSULATED CARBON NANOTUBES AND METHOD FOR PRODUCDING SUCH CARBON NANOTUBES VIA SOLVENT SHELL REACTIONS WITH METALLIC IONS

CROSS-REFERENCE TO RELATED APPLICATIONS

This application is a divisional of U.S. patent application Ser. No. 16/161,640, filed Oct. 16, 2018, which is incorporated by reference herein in its entirety.

STATEMENT REGARDING FEDERALLY SPONSORED RESEARCH OR DEVELOPMENT

This invention was made with Government support under contracts FA8650-16-P-2737 and N68335-17-C-0423 awarded by the U.S. AirForce and Office of Naval Research, respectively. The Government has certain rights in the invention.

BACKGROUND OF THE INVENTION

The present invention is directed to metal encapsulated carbon nanotube material or similar individual nanoscale additive material, such as metallic or ceramic nanowires or nanoparticles (hereinafter also referred to collectively as individual nanoscale additive material) and to a method for encapsulating each individual additive material in a shell of material similar to the matrix to improve the interface between the individual additive material and the metallic, organic, inorganic or ceramic binding matrix material.

Since their discovery, carbon nanotubes (CNTs) have been of great interest to the scientific community for their incredible physical, electrical, and thermal properties. Harnessing these properties into usable materials remains difficult due to challenges in separating CNTs by type, integrating CNTs into composite material, and synthesizing long CNTs. Integrating CNTs into metal composites has long been a goal for researchers as a way to increase wire strength and reduce wire weight. Current methods of CNT coating such as vapor phase, electroless, and electrolytic deposition processes either coat large bundles or wires of CNTs, not discrete, individual CNT.

Individual CNTs have theoretical tensile strengths over 100 GPa. Experimental studies have shown tensile strengths up from 40-50 GPa for individual tubes. [1: Peng, Locascio, Zapol, Li, Mielke, Schatz and Espinosa; Measurements of near-ultimate strength for multiwalled carbon nanotubes and irradiation-induced crosslinking improvements. Nat Nanotechnol, 2008, (3), 626.] It is well known that integrating high strength reinforcing additives into metals can increase the tensile strength of the resulting composite as a function of additive strength and loading. Additionally, recent studies have shown that integrating even small amounts of nanomaterials into a metal matrix can substantially increase the strength of the resulting nanocomposite. For example, the Fraunhofer Institute has demonstrated up to 30% improvement in tensile strength of a copper-CNT (CuCNT) nanocomposite by adding up to 10 vol % CNT.[2: IFAM; Metal/Carbon Nanotube Composite. Fraunhofer IFAM.]

The strength improvement of a composite is dependent on the mechanical properties of the matrix and reinforcing material. The dispersion of the reinforcing material and the interfacial interaction of the nanomaterial and matrix can further affect the composite strength. Traditional mixing methods such as dry mixing and ball milling can lead to aggregation of the reinforcing agent due to the immense surface energy associated with nanomaterials. High energy mixing methods, such as ultrasonication, can improve CNT mixing within a metal matrix. However, improved mixing does not guarantee improved interfacial bonding between the additive and matrix which can limit the ultimate material properties.

U.S. Patent Publication No. 2011/0076497 A1 discloses a method for encapsulating CNTs in a polymeric shell using a solvent environment system. We have found, however, that successfully production of a metallic shell requires complete changes to the immiscible phases, precursors and reducing agents.

BRIEF SUMMARY OF THE INVENTION

We have discovered that a superior individual nanoscale additive material such as a metal-encapsulated carbon nanotube can be obtained by way of an improved interface between the individual nanoscale additive material and the metallic, organic, inorganic or ceramic binding matrix material by using a process that begins with CNTs being suspended in water via a surfactant micelle, then adding an organometallic precursor in an oil phase which swells the micelle around the CNT before adding a reducing agent to the aqueous phase to reduce the organometallic precursor to its base metal and collapse the metal around the CNT. The metal coated CNTs are then collected and mixed into the metal matrix. This method allows large quantities of metal-coated CNT nanostructures to be produced that enable better interfacial interaction with the bulk material and can be used to engineer or select mechanical, thermal, and electrical properties of the metal nanocomposite.

The present invention encapsulates the individual CNT in a metallic shell which allows the CNT to act energetically similar to the surrounding material, thereby limiting agglomeration and improving the bonding between CNT and metal matrix. As a result, improvements in material properties including, but not limited to, electrical and thermal conductivity, tensile strength, flexural strength, fatigue life are achieved.

Other objects, advantages, and novel features of the present invention will become obvious when considered in conjunction with the accompanying drawings.

DETAILED DESCRIPTION OF THE DRAWINGS

Figure 1A:
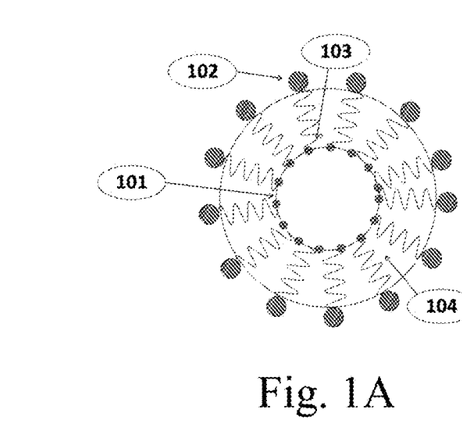
FIGS. 1A-1E are schematic step-by-step diagrams illustrating the CNT encapsulation process of the present invention.
Figure 1B:
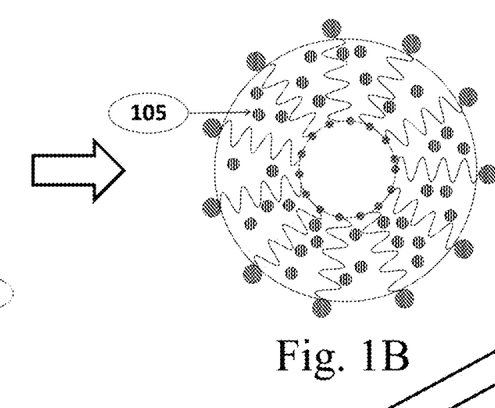
Figure 1C:
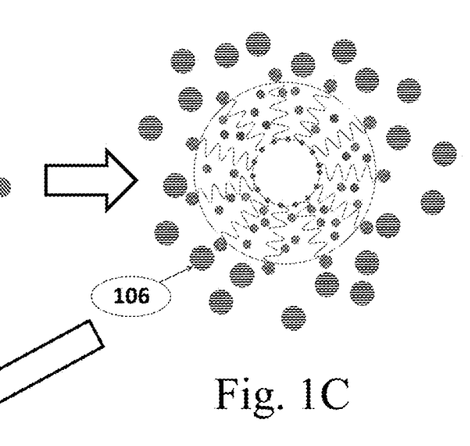
Figure 1D:
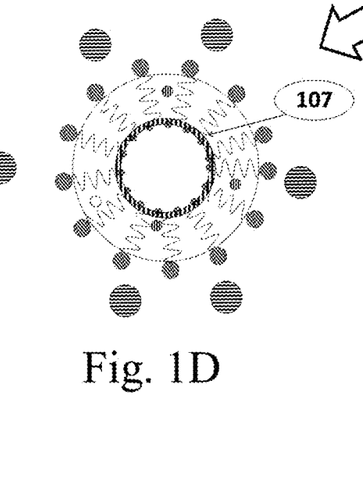
Figure 1E:
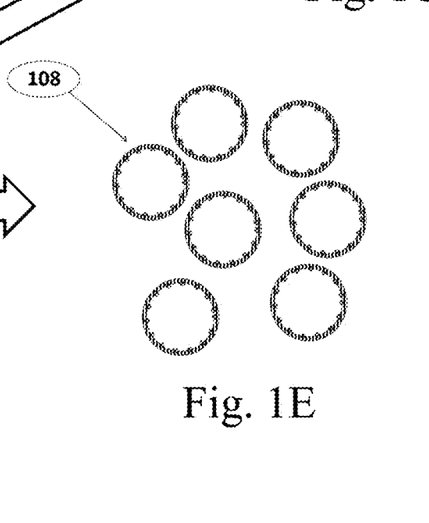

Referring to FIGS. 1A-1E, our method is comprised of a series of mixing and reacting steps which ultimately lead to encapsulated CNTs. In FIG. 1A, the CNT 101 is suspended in water using a surfactant composed of a hydrophilic head 102 and a hydrophobic head 103 which creates an immiscible oleophilic micellar region 104 around the CNT. In FIG. 1B, the aqueous CNT suspension is then mixed with an oil phase containing dissolved metal salts 105 which remain inside the micelle, near the CNT and cause the micelle to swell. In FIG. 1C, an aqueous reducing agent 106 is then added to the swelled suspension and thoroughly mixed. In FIG. 1D at the water-oil interface, the reducing agent in the aqueous phase reacts with the dissolved metal salt in the oil phase reducing the metal salt and leading the metal to collapse around the CNT 107. In FIG. 1E, the surfactant is rinsed away causing the suspension to collapse and the metal-coated CNTs 108 are collected. The two solution phases, i.e., the water and oleophilic micellar region 104 of FIGS. 1A and 1B must be immiscible and the two reactants 105, 106 of FIGS. 1B and 1C must be respectively soluble only in the opposing phases such that reaction and reduction of the metal only occurs at the interface between the phases. For example, the metal precursor, being only soluble in the immiscible phase immediately adjacent to the nanostructure 104, reacts with the reducing reactant, being only soluble in the bulk solution, react and form the metal coating at the interface between the bulk solution and immiscible phase 104.

Figure 2A:
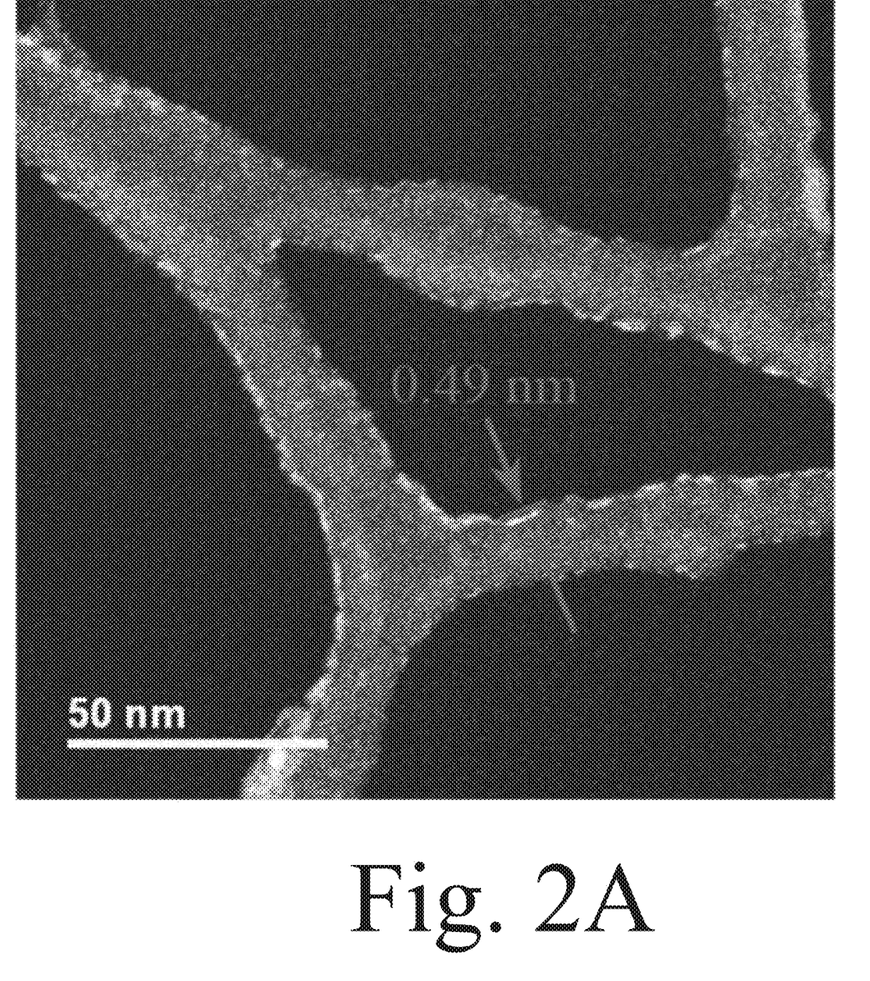
FIGS. 2A-2B are, respectively, a tunneling electron micrograph with electron energy loss spectroscopy which show bright edges indicative of metal presence on the edges of the CNTs and a TEM image of a coated CNT bundle with electron energy loss elemental scan showing copper on the CNT surface.
Figure 2B:
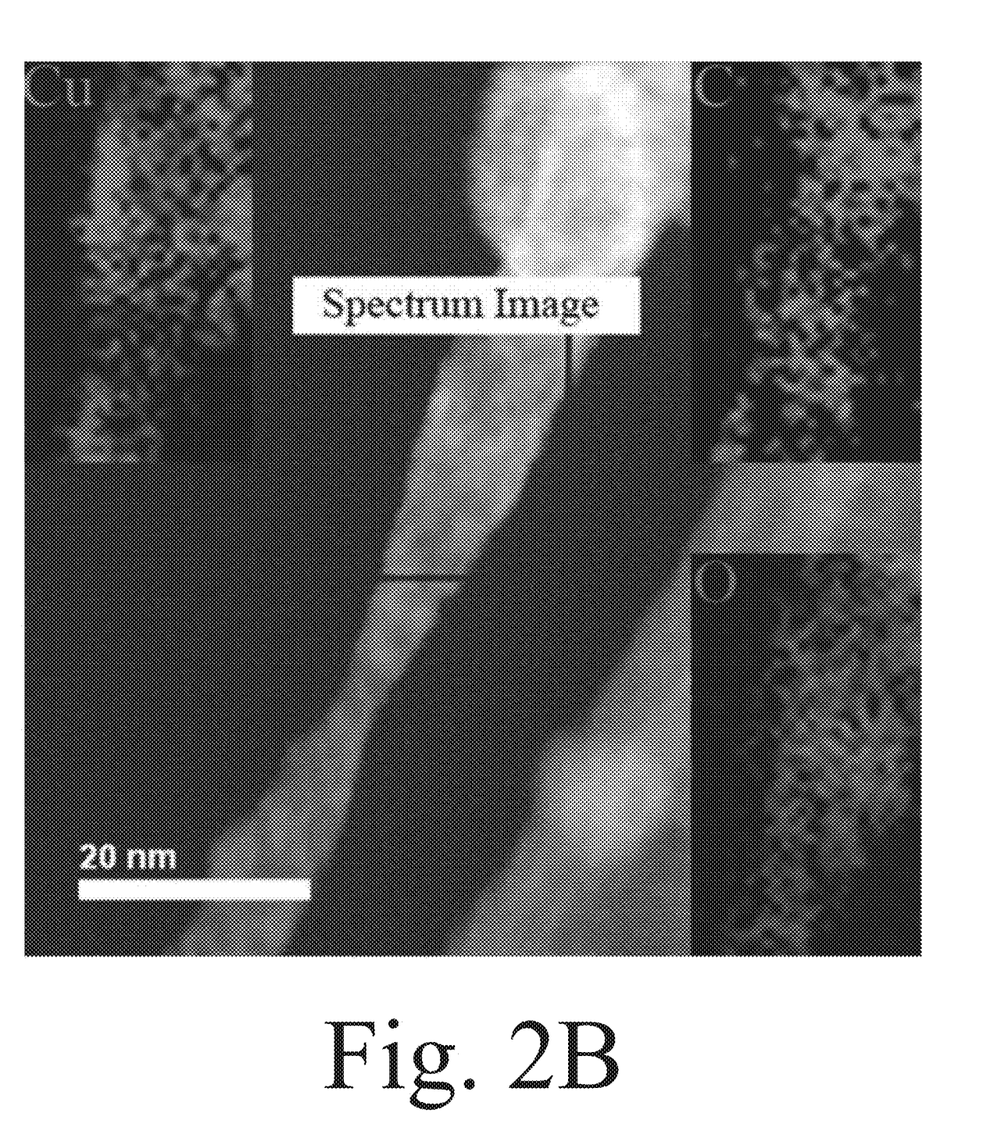

FIG. 2A is a dark field tunneling electron micrograph of CNTs that have undergone the encapsulation process. The bright spots around the edges are indicative of heavier elements, namely a metal, at these sites. The metal layer measures 0.49 nm. FIG. 2B is a TEM image of a CNT bundle with EELS elemental mapping showing Cu on the surface. There is also oxygen observed on the surface likely due to oxidation of the copper layer during storage under air.

Figure 3A:
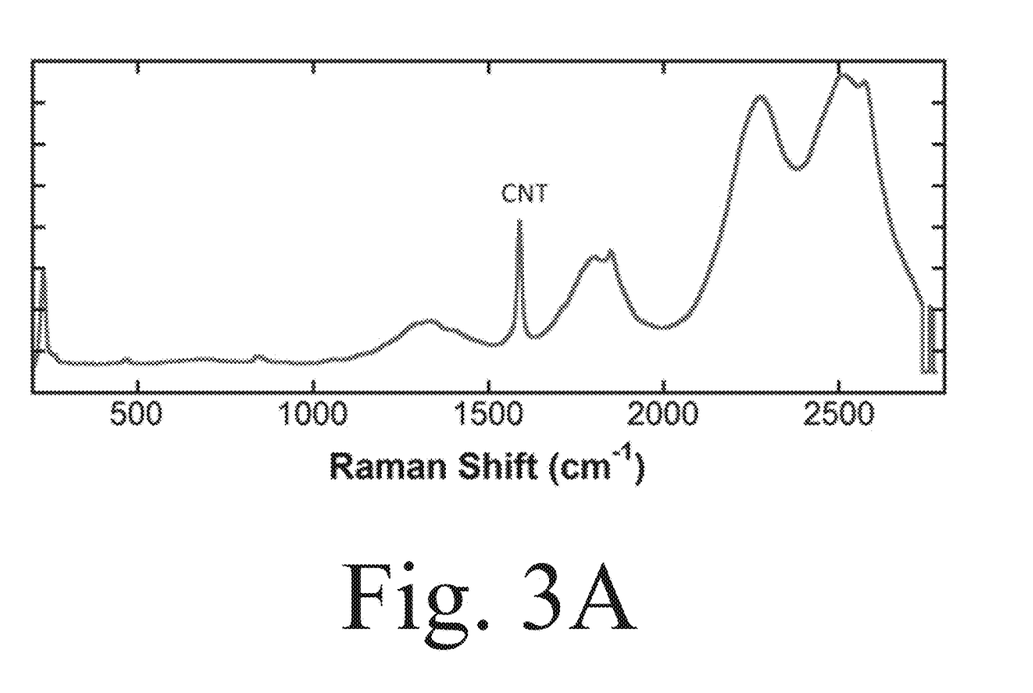
FIGS. 3A-3C are Raman spectra of CNTs, dissolved Cu salt, and Cu-encapsulated CNTs showing the CNT structure remains stable after encapsulation according to the method of the present invention.
Figure 3B:
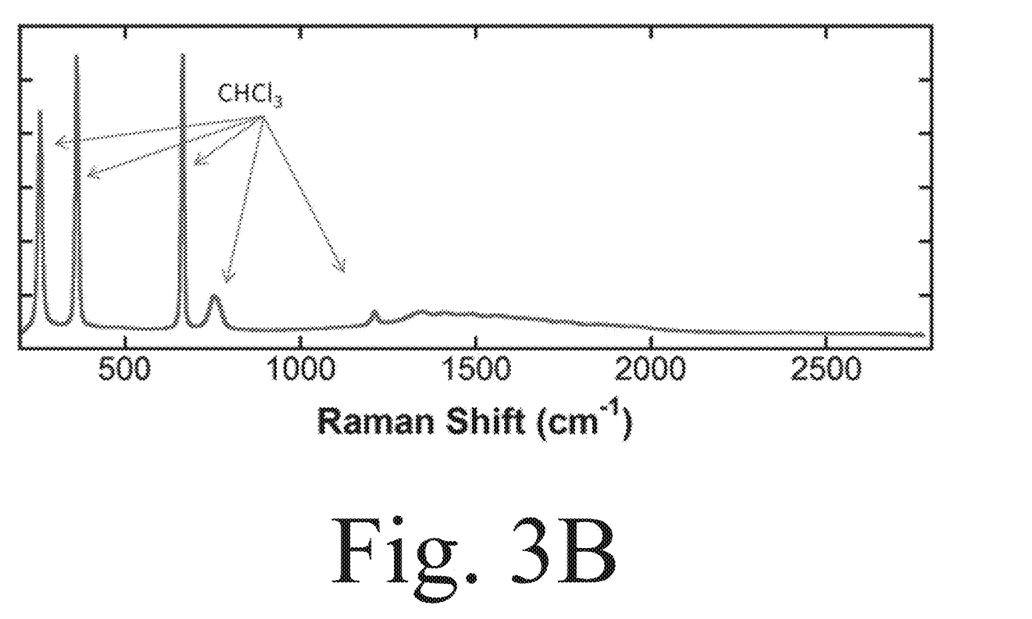
Figure 3C:
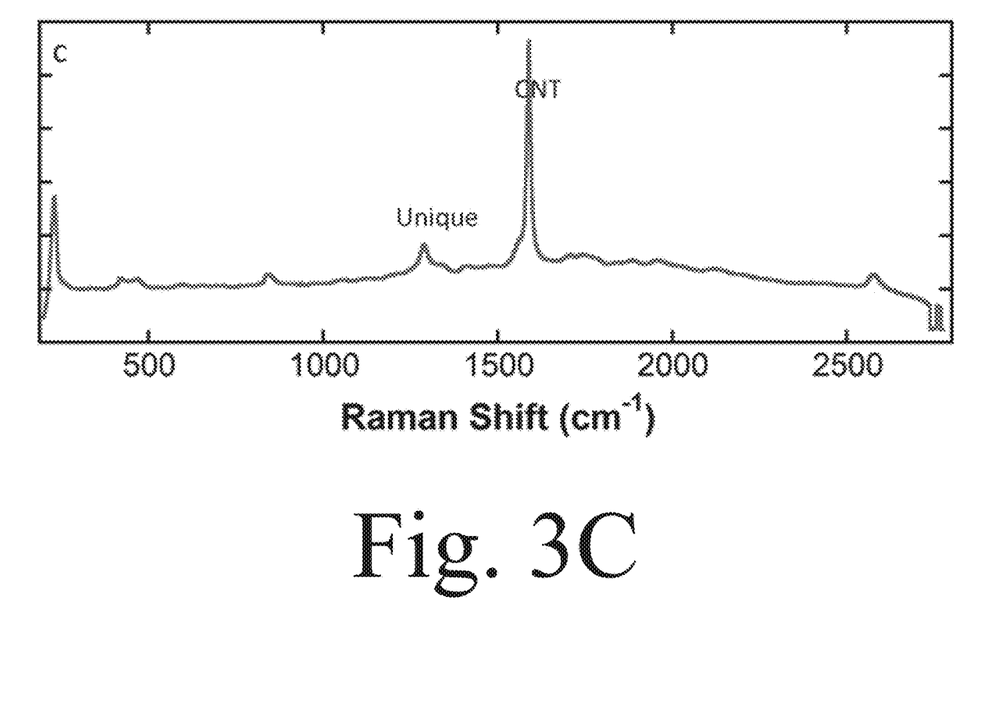

FIGS. 3A-3C are, respectively, Raman spectra of the suspended CNTs, Cu in an organic solvent, and suspended Cu-coated CNTs. In FIG. 3A, the peak at 1650 cm$^{-1}$ is indicative of highly graphitic CNTs while the wide peaks between 1700 and 2500 cm$^{-1}$ are artifacts of the sodium dodecyl beneze sulfonate (SDBS) surfactant micelle structure used to suspend the CNTs. FIG. 3B shows the Raman spectra of copper acetyleacetonate (Cu(acac)$_2$) in chloroform where the peaks at 150, 350, 600, 700, and 1250 cm$^{-1}$ are from the chloroform. FIG. 3C shows the Raman spectra of the suspended CNTs after encapsulating with copper and rinsing to remove the SDBS. There are no chloroform peaks present in the Raman signal indicating that the oil-phase and any of the remaining and unreacted dissolved metal-containing salts have been removed.

Figure 4:
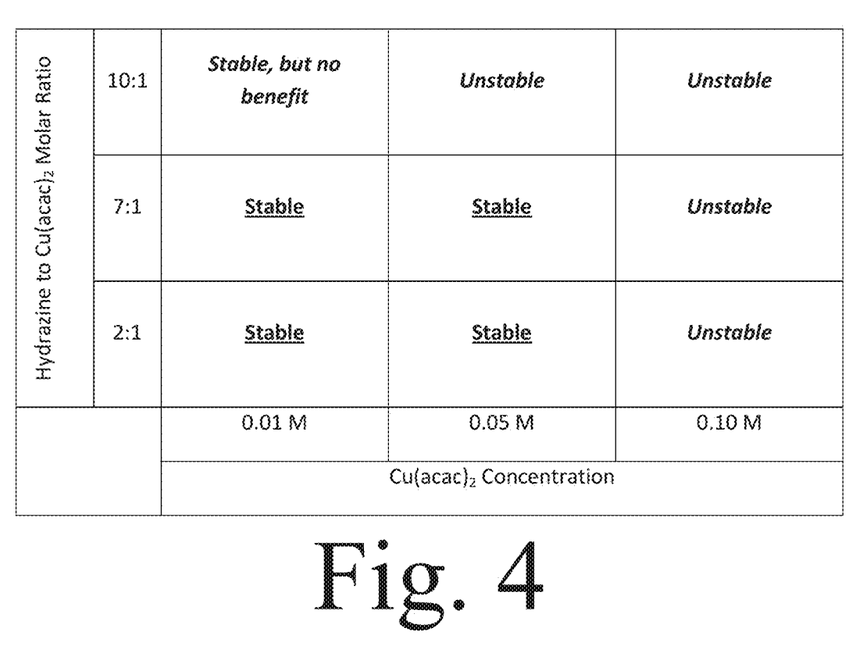
FIG. 4 is a table indicating the stability limits for the concentrations of each reactant in the process according to the present invention.

FIG. 4 is a table showing the stability of a CNT suspension with swelled surfactant micelles containing Cu(acac)$_2$ in chloroform at various Cu(acac)$_2$ concentrations as the ratio of the reducing agent to metal precursor concentration is varied. For this specific case of Cu(acac)$_2$ in chloroform with hydrazine as the reducing agent, Cu(acac)$_2$ concentrations below 0.10 M and a molar ratio of hydrazine to Cu(acac)$_2$ concentrations below 10:1. Working within a stable reaction zone is critical to completing the CNT metal encapsulation process and forming completely encapsulated CNTs.

Figure 5:
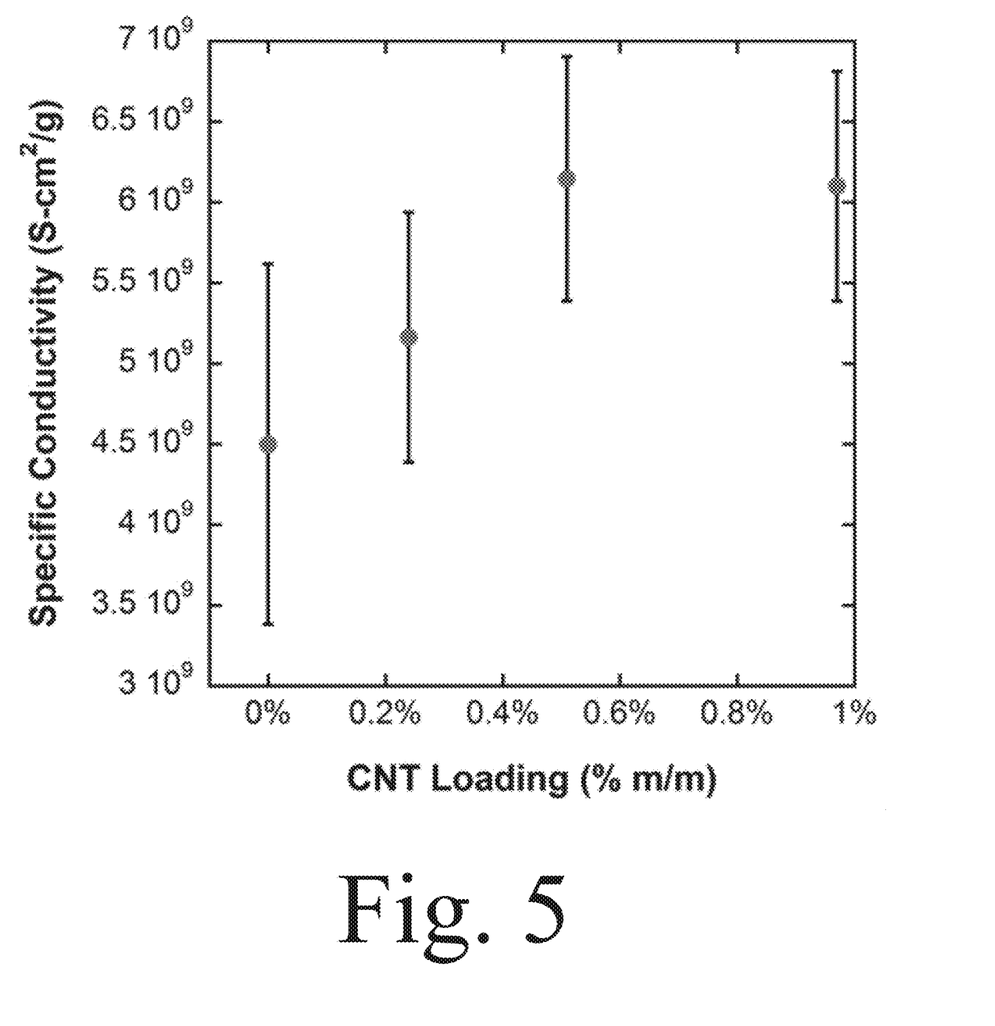
FIG. 5 is a graph showing the improvement in specific conductivity of a copper metal by adding Cu-encapsulated CNTs made in accordance with the present invention.

FIG. 5 is a graph showing the effect of Cu-encapsulated CNT loading on the specific conductivity of a Cu-CNT composite. Suspended single-wall CNTs were encapsulated using Cu(acac)$_2$ as the metal salt selectively soluble in the oil, chloroform as the oil phase, and hydrazine as the reducing agent that is selectively soluble in the water phase. As the loading of Cu-encapsulated CNTs was increased from 0-1% m/m the specific conductivity of the material increased from $4.5 \times 10^9$ to $6.1 \times 10^9$ S-cm$^2$/g based on four-point-probe measurements.

Figure 6:
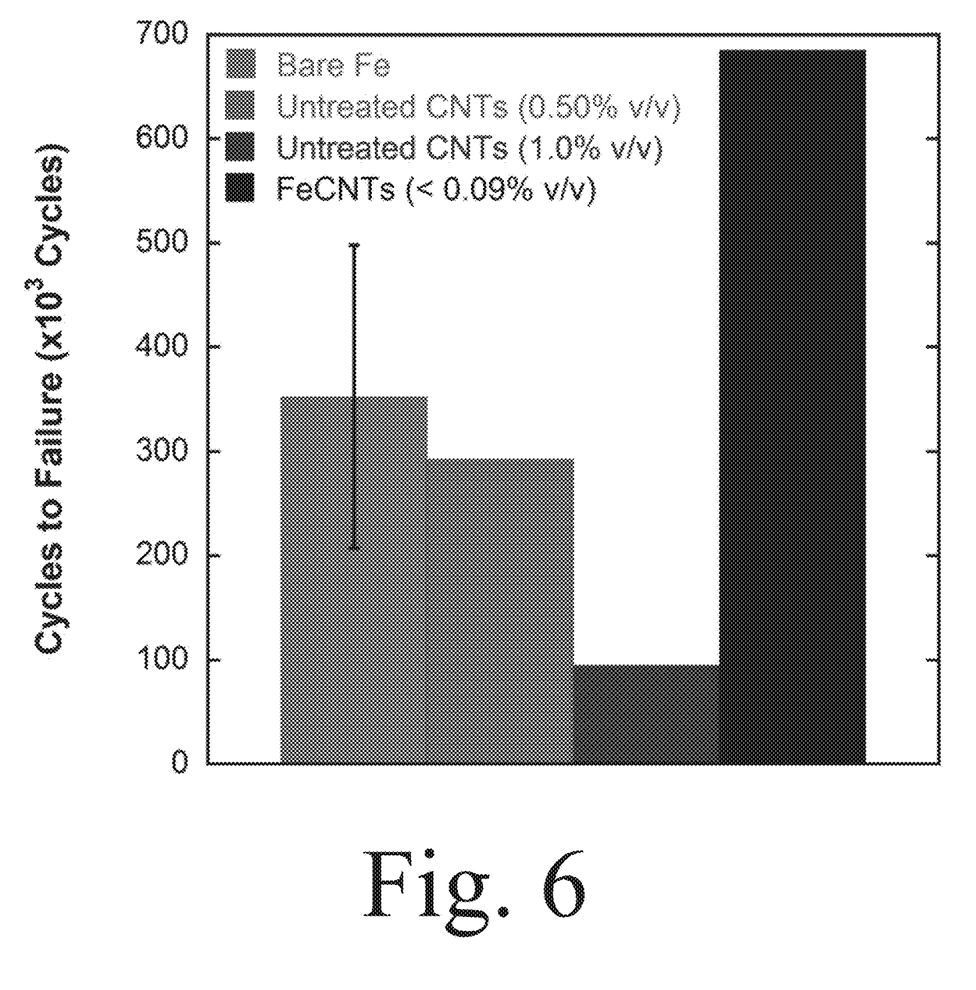
FIG. 6 is a chart showing improvement cyclic fatigue life by adding Fe-encapsulated CNT made according to the present invention over adding untreated CNTs to an iron matrix.

FIG. 6 is a chart showing the effectiveness of our Fe-encapsulation method on the fatigue life performance of an iron-CNT composite. Suspended, single-wall CNTs were coated with Fe using iron (III) acetylacetonate (Fe(acac)$_3$) as the metal salt selectively soluble in the oil, chloroform as the oil phase, and hydrazine as the reducing agent selectively soluble in the water phase. The Fe-encapsulated CNTs were dry mixed with pure iron powder at loadings up to 0.09% v/v. Non-encapsulated CNTs were also mixed with pure Fe powder at 0.5% and 1% v/v. The powders were first spark-plasma sintered (SPS) to form solids, then milled using electrical discharge machining (EDM) to form dog-bone shapes for fatigue life testing. Adding untreated CNTs to the metal powder reduced the fatigue life likely by providing more sources of crack propagation and weak points where the CNTs aggregate. As can be seen in FIG. 6, the sample containing Fe-encapsulated CNTs increased the fatigue life of the pure iron by nearly 100%

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

We claim:

1. A method for encapsulating nanoscale material, comprising:
   (a) producing a suspension of the nanostructure material in a first solvent using a micelle surrounding the nanostructure material,
   (b) swelling the micelle surrounding the suspended nanostructure material by adding to and mixing with the suspension an immiscible phase second solvent containing a precursor, and
   (c) reducing the precursor by consisting of the step of adding a reducing reactant selectively soluble in the first solvent that reacts to the precursor containing reactant selectively solvated in the second solvent to encapsulate the nanostructure material; wherein the reducing reactant being used is hydrazine.

2. The method of claim 1, further comprising:
   (d) collecting and mixing the encapsulated nanostructure material into a matrix.

3. The method of claim 2, wherein the matrix is a metal matrix.

4. The method of claim 1, wherein the nanostructure material is comprised of individual carbon nanotubes suspended in the first solvent.

5. The method of claim 1, wherein the second solvent comprises an oil phase with the precursor.

6. The method of claim 1, wherein the precursor is an organometallic precursor that is reduced to its base metal in step (c).

7. The method of claim 6, wherein the second solvent comprises an oil phase with the precursor.

8. The method of claim 1, wherein the surfactant is selected to provide a hydrophilic head and a hydrophobic head for producing an oleophilic micellar region around the suspended nanostructure material.

9. The method of claim 8, wherein the nanostructure material is comprised of individual carbon nanotubes.

10. The method of claim 9, wherein the nanostructure material is comprised of single-wall carbon nanotubes and the metal salt is iron (III) acetylacetonate ($Fe(acac)_3$) or copper (II) acetylacetonate ($Cu(acac)_2$) and with chloroform as the immiscible phase being used in step (b).

11. The method of claim 1, wherein the precursor contains dissolved metal salt.

\* \* \* \* \*